J. P. HEDSTROM.
SAW GRINDING MACHINE.
APPLICATION FILED JUNE 28, 1920.

1,401,696.

Patented Dec. 27, 1921.
6 SHEETS—SHEET 4.

Inventor
John P. Hedstrom
By Frank E. Liurance Jr.
Attorney

J. P. HEDSTROM.
SAW GRINDING MACHINE.
APPLICATION FILED JUNE 28, 1920.

1,401,696. Patented Dec. 27, 1921.
6 SHEETS—SHEET 5.

Inventor
John P. Hedstrom
By Frank E. Liurance, Jr.
Attorney

UNITED STATES PATENT OFFICE.

JOHN P. HEDSTROM, OF BIG RAPIDS, MICHIGAN, ASSIGNOR TO MACHINERY COMPANY OF AMERICA, OF BIG RAPIDS, MICHIGAN, A CORPORATION OF MICHIGAN.

SAW-GRINDING MACHINE.

1,401,696.  Specification of Letters Patent.  Patented Dec. 27, 1921.

Application filed June 28, 1920. Serial No. 392,311.

*To all whom it may concern:*

Be it known that I, JOHN P. HEDSTROM, a citizen of the United States of America, residing at Big Rapids, in the county of Mecosta and State of Michigan, have invented certain new and useful Improvements is Saw-Grinding Machines; and I do hereby declare the following to be a full, clear, and exact description of the invention, such as will enable others skilled in the art to which it appertains to make and use the same.

This invention relates to saw grinding machines. It is an object and purpose of the present invention to construct a saw grinding machine by means of which saws, irrespective of their condition may be ground so as to place them in perfect serviceable condition; in fact the saw may be totally unfit for use and with the machine of my invention be brought back to perfect shape, the machine having a range of use such that a perfectly plain disk might be fully provided with a consecutive series of saw teeth by its use. A further object of the invention is to provide a machine of this character by means of which the teeth of a saw may be ground in succession one after the other, and after all of the teeth have been ground the same, the saw is automatically changed in position with reference to the grinding wheel for a further grinding of the teeth, said automatic changing occurring each time the whole series of teeth on the saw have been ground the same, or with each complete turning of the saw and grinding of each tooth thereon. A still further object of the invention is to provide such machine with various adjustments whereby saw teeth of different characters may be ground, practically any type of saw being taken care of in the one machine, and any size or shape of tooth being ground thereon. Many other objects and purposes than those specifically stated will appear fully and in detail as understanding of the invention is had from the following description, taken in connection with the accompanying drawing, in which.

Like reference characters refer to like parts in the different figures of the drawings.

In the construction of the machine, a supporting post or column 1 carries a housing at its upper end having a bottom 2, top 3, sides 4 and 5, a back 6 and a front 7, the housing being substantially cubical in form, though not necessarily exactly so. One side, as 4, has an opening normally closed by a door 8 so that access to the interior may be had.

Figure 1:
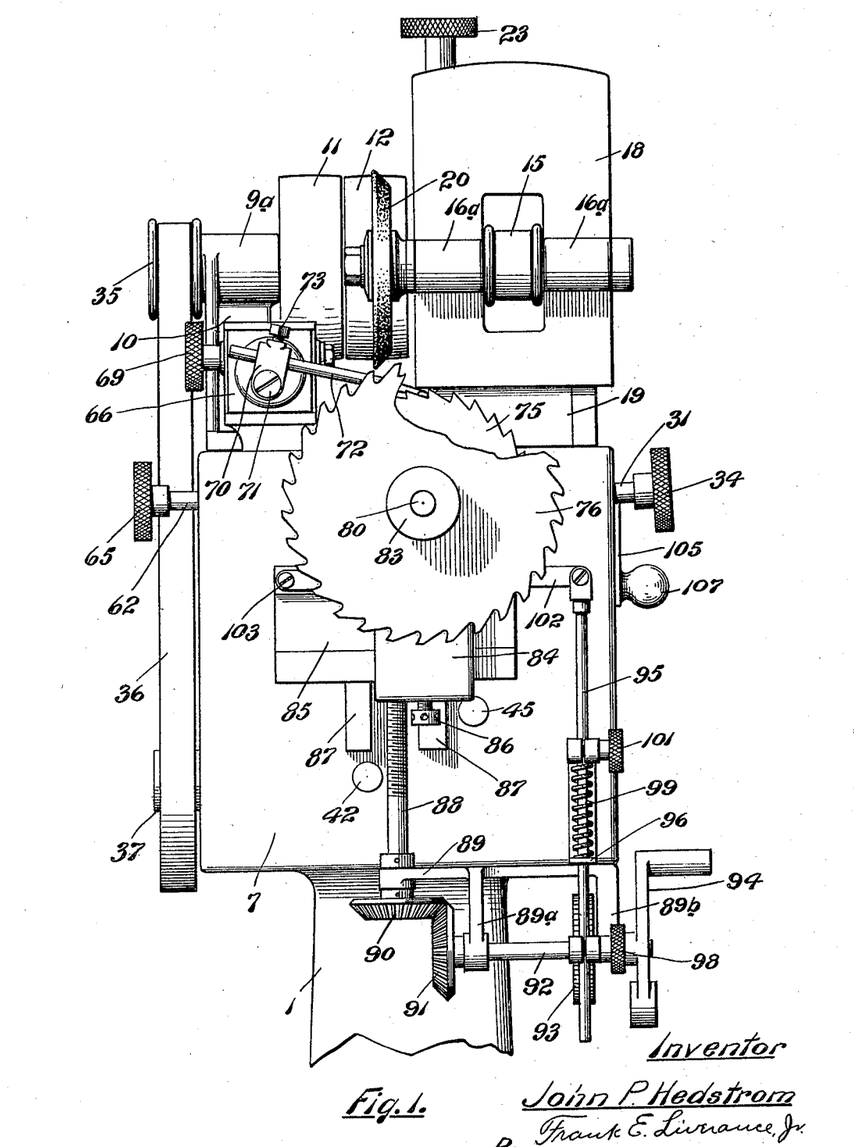
Figure 1 is a front elevation of the saw grinding machine.
Figure 2:
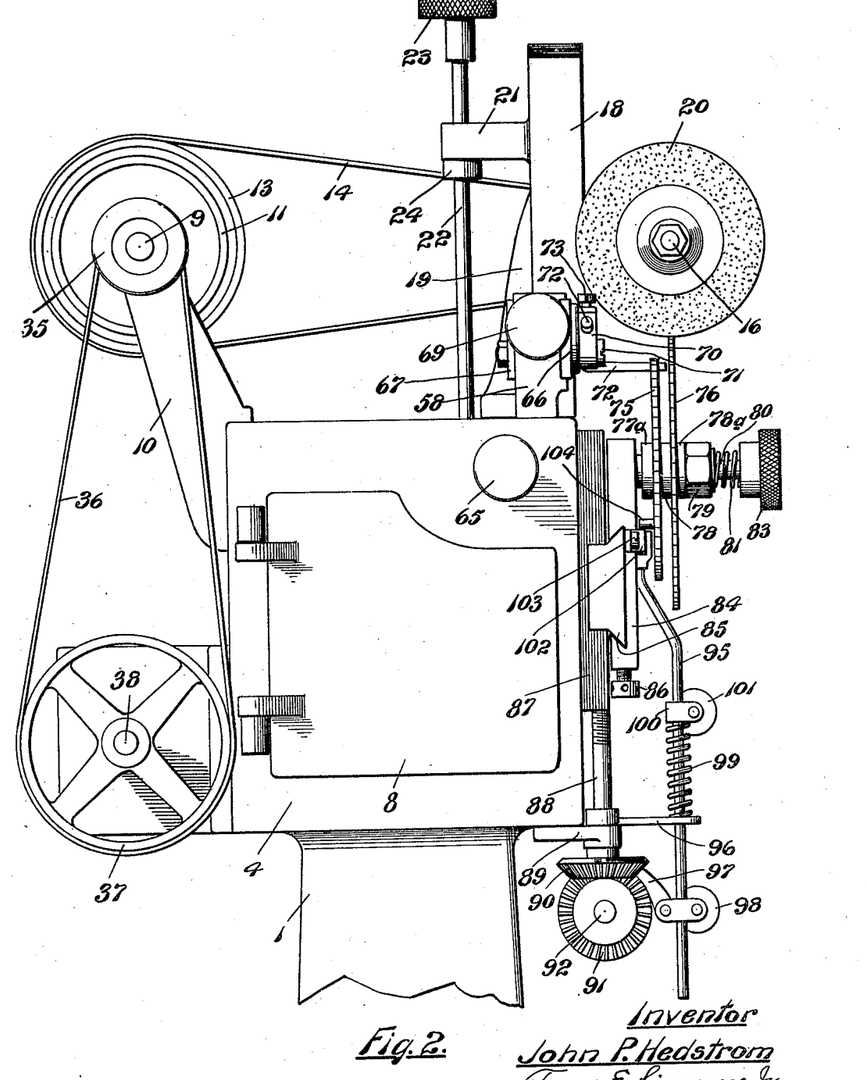
Fig. 2 is a side elevation thereof.
Figure 3:
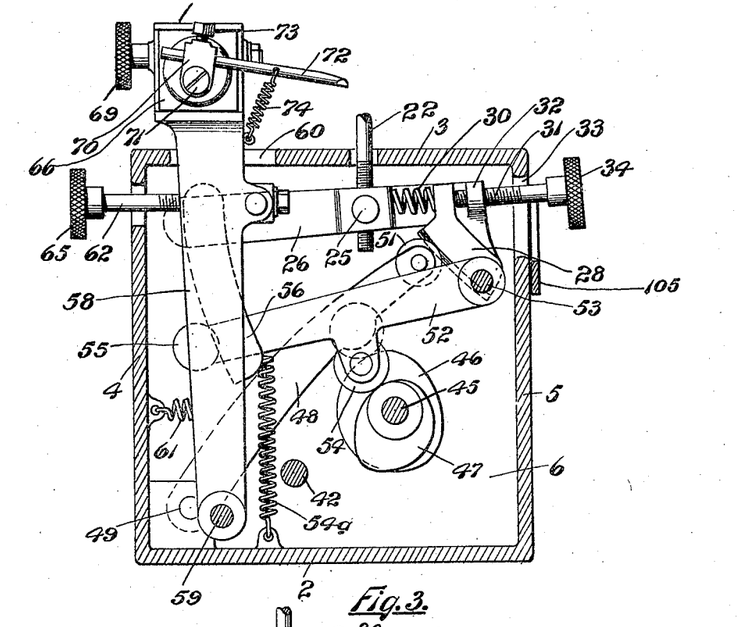
Fig. 3 is a vertical section through the casing or housing for the operating mechanism of the machine, said section being immediately back of the front side of the housing and parallel thereto.
Figures 4, 5, 6:
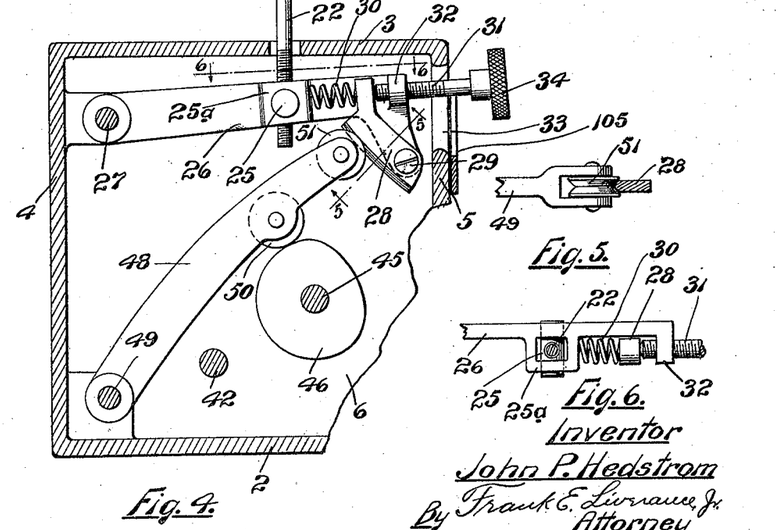
Fig. 4 is a similar section in a plane parallel to the plane of the section of Fig. 3 but back thereof.
Figs. 5 and 6 are sections taken, respectively, on lines 5—5 and 6—6, of Fig. 4.
Figure 7:
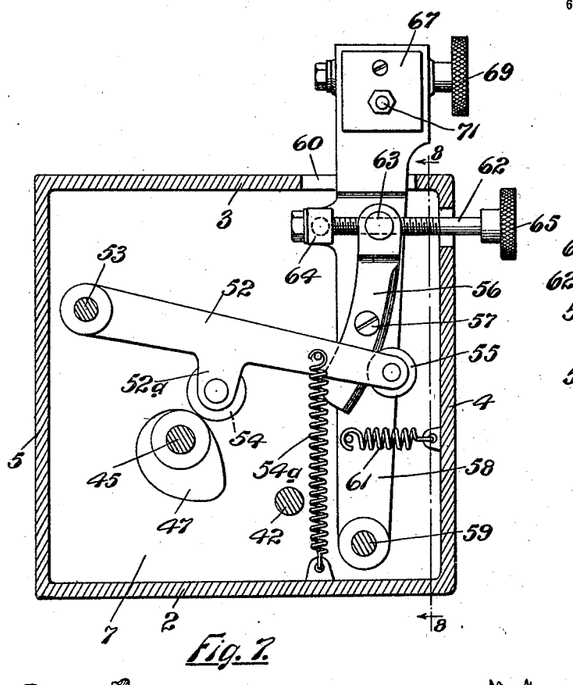
Fig. 7 is a section showing the rear side of said housing removed and looking at the mechanism from the rear, certain parts not being shown.
Figure 8:
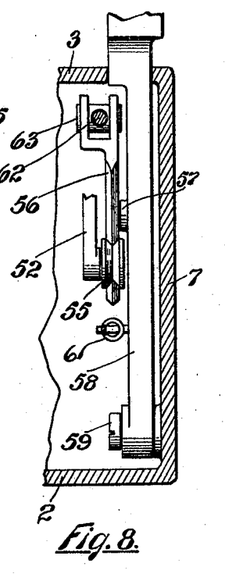
Fig. 8 is a fragmentary section on the plane of line 8—8, of Fig. 7.

A shaft 9 is mounted in bearings 9ᵃ at the upper ends of supporting brackets 10 carried at the rear of and extending upwardly from the housing as shown in Fig. 2. On this shaft two pulleys 11 and 12 are located, one of which is loose, and the drive belt from any suitable line shafting or other source of power passes around the same, being shiftable from one to the other in the usual manner. The shaft also carries a drive pulley 13 around which a belt 14 passes, it also passing around a pulley 15 on a shaft 16 mounted in bearings 16ᵃ formed at the front ends of forwardly extending arms 17 cast integral with a plate 18 which is mounted for vertical movements on a post 19 secured at its lower end to the upper side of and at the front of the housing. A grinding wheel 20 is secured at the inner end of shaft 16. This wheel is removable and may be replaced at any time by others for the grinding of different sizes and types of saw teeth.

An arm 21 extends rearwardly from the plate 18 through which a rod 22 passes, being provided with an operating head 23 at its upper end and with a collar 24 on which the arm 21 rests. The lower end of rod 22 is threaded and passes through a nut 25 swivelly mounted in an enlargement 25ᵃ on a lever 26 pivotally mounted at one end at 27 within the housing. At its opposite end lever 26 carries a shoe 28 pivotally mounted at 29 on the lever. A coiled spring 30 under compression is disposed between the upper end of the shoe and the enlargement 25ᵃ and a screw 31 threads through a laterally offset lug 32 on the lever against the shoe. The screw extends through a slot 33 in the side 5 of the housing and is equipped with an operating head 34 by means of which the position of the shoe may be adjusted from outside the housing.

Figure 15:
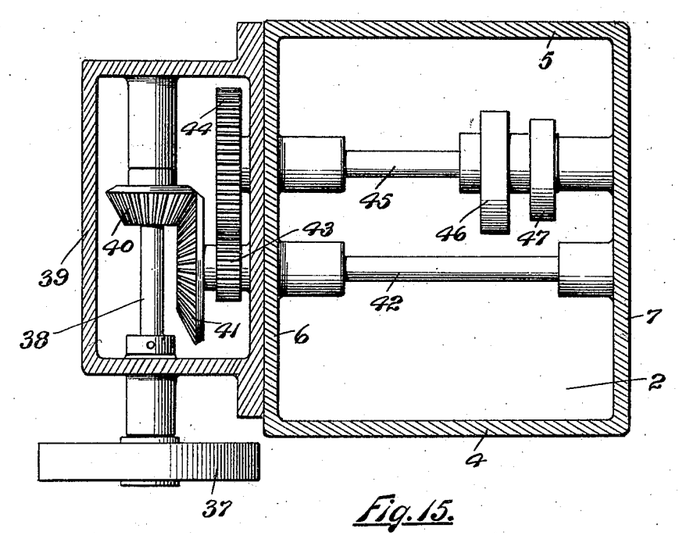
Fig. 15 is a horizontal section taken through the housing above the cross shafts therein, various parts of the mechanism not being shown in the view.
Figure 16:
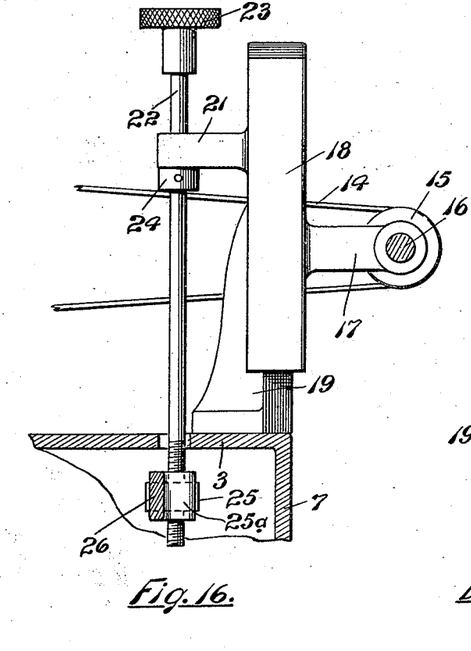
Fig. 16 is a fragmentary vertical section and side elevation showing the movable mounting for the grinding wheel shaft.
Figure 17:
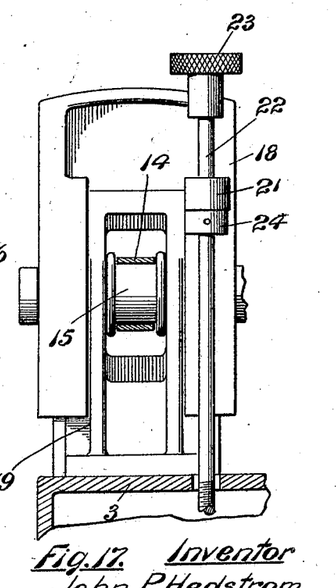
Fig. 17 is a rear elevation thereof.

Shaft 9 carries a small drive pulley 35 at one end around which a belt 36 passes, the same also passing around a wheel or pulley 37 fixed at one end of a shaft 38 which is mounted in and passes through a casing 39 attached at the rear of the housing. A beveled gear 40 on shaft 39 meshes with a similar larger gear 41 fixed at the end of shaft 42 which passes into and through the housing for steady bearing support. A pinion 43 on shaft 42 drives a gear 44 on a second shaft 45 parallel with shaft 42 as shown in Fig. 15. Two cams 46 and 47 are mounted in fixed relation on the shaft 45.

A lever 48 is pivotally mounted at 49 at its lower end in the housing and extends upwardly over the cam 46, carrying a roller which rides on the cam. At its upper end it carries a grooved roller 51 which is adapted to engage with the under side of shoe 28, the shoe being shaped to fit the grooved roller to prevent disengagement therefrom. It is evident that with each revolution of the shaft 45, the lever 48, and also the lever 26 is raised and lowered once with a consequent raising and lowering of plate 18, shaft 16 and the grinding wheel 20 attached to the shaft, and that the amount of this movement may be adjusted within limits by changing the position of the shoe 28 through operation of the adjusting screw 31.

A second lever 52 is mounted at one end on a pivot 53 in the housing and extends across and above the shaft 45 and on a downwardly projecting portion 52ᵃ thereof a roller 54 is mounted which rides on the cam 47, being held against the cam by a spring 54ᵃ. At its free end the lever carries a grooved roller 55 which bears against a shoe 56 pivotally mounted between its ends at 57 on a vertically positioned arm 58 which is pivotally mounted at 59 at its lower end within the housing and which extends above the housing, passing through a slot 60 in the top 3 thereof. The arm 58 is normally drawn toward the side 4 by a spring 61. An adjusting screw 62 threads through a nut 63 swivelly carried at the upper end of the shoe 56 and is operatively connected at its inner end at 64 with the arm 58, the screw passing outwardly through an opening in side 4 and having an operating head 65 attached to its outer end. On turning said screw, the position of the shoe 56 is changed with a consequent changing of the extent of swing of the arm 58 with each revolution of the shaft 45 as is evident.

Figure 11:
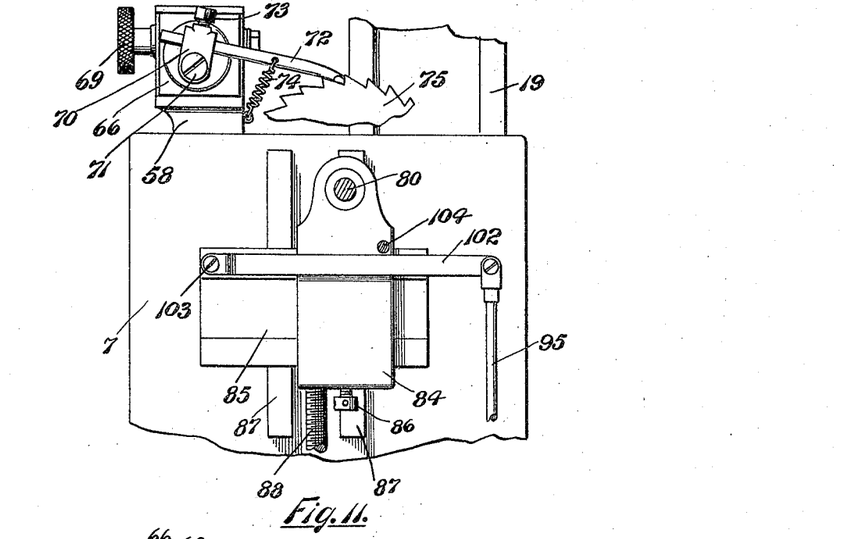
Fig. 11 is a fragmentary front elevation of the machine, certain parts being removed to show the structure back of the saw.
Figure 12:
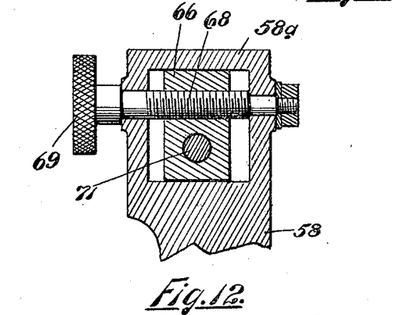
Fig. 12 is a vertical enlarged section through the upper part of the head of the disk operating lever.
Figure 13:
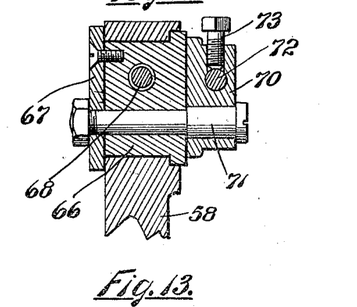
Fig. 13 is a similar section taken at right angles to the plane of the section shown in Fig. 12.
Figure 14:
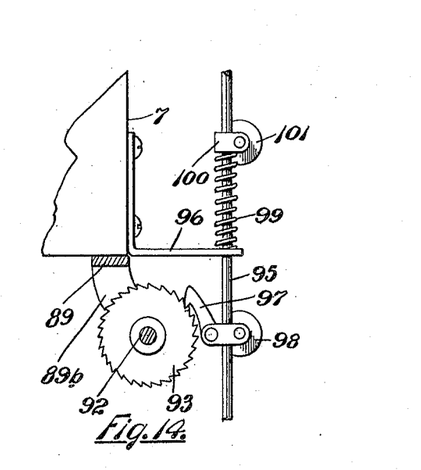
Fig. 14 is a side elevation of a part of the automatic upward feed mechanism for elevating the saw at the completion of each cycle of grinding.

The head 58ᵃ of arm 58 is enlarged and formed with an opening rectangular in cross section therethrough in which a block 66 is adjustably mounted, the same being flanged at one side to bear against a side of the head and held in place by a plate 67 detachably connected to the opposite side of the block. An adjusting screw 68 threads through the block and is rotatably mounted on the head, being equipped with an operating head 69. Turning the screw shifts the position of the block with reference to the head 58ᵃ. A bolt 71 passes through the block 66 and plate 67 on which a member 70 is pivotally mounted. A rod 72 passes through the member 70 above the pivotal mount therefor and is adjustably connected thereto by a set screw 73. Normally the rod 72 is yieldingly held in a lower position by the tension of spring 74 attached thereto and to the arm 58 as shown in Fig. 11.

The rod 72 at a distance from the member 70 is turned forward so as to engage with a disk 75 provided with a consecutive series of ratchet teeth, equal in number to the teeth on the saw 76 with which it is associated. The ratchet disk and the saw are secured on a sleeve 77, the disk backing against a flange 77ª thereon. Between the disk and saw a spacing collar 78 is placed and a similar collar 78ª lies against the outer side of the saw, all being securely but detachably connected together by a binding nut 79 threaded onto the end of the sleeve. The disk 75 should be approximately somewhere near the saw 76 in diameter for the best results, though the machine works satisfactorily with a smaller ratchet disk so long as the number of teeth therein equals the number of teeth in the saw.

Figure 10:
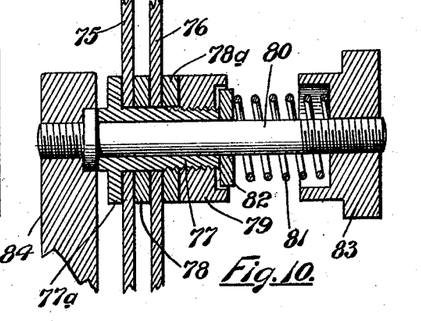
Fig. 10 is a fragmentary enlarged vertical section through the mount for the saw and its coöperating ratchet disk.

The assembly of ratchet disk and saw is placed over a stationary arbor 80. A coiled spring 81 bears against a washer 82 placed over the arbor and against the end of sleeve 77 and may be more or less compressed by nut 83 threaded on to the end of the arbor as shown in Fig. 10. The arbor is designed to be secured at the upper end of a supporting member 84 which is mounted for sliding adjustment on a horizontal slide bar 85 and which is held in any position to which it may be moved by a set screw 86. The bar 85 in turn is slidably mounted for vertical adjustment on vertical guide bars 87 which are either formed integral with the front 7 of the housing or permanently secured thereto in any suitable manner.

A shaft 88 threaded at its upper end and threading into the bar 85 is mounted vertically at the front of the housing passing through a bracket 89 attached to the under side of the housing and held from vertical movements by set collars thereon one above and the other below the bracket. A beveled gear 90 is secured to the lower end of the shaft and is in mesh with a similar gear 91 attached at one end of a horizontal shaft 92 mounted on and carried by downwardly extending arms 89ª and 89ᵇ of the bracket 89. A ratchet wheel 93 is secured on shaft 92 between its ends and at the outer end a crank 94 is attached for manual operation of the shaft with a consequent raising or lowering of the bar 85 and the parts mounted thereon.

A rod 95 is positioned vertically in front of the housing, passing downwardly through a bracket 96 attached to and extending in front of the front 7 of the housing. A dog 97 adjustably connected adjacent the lower end of the rod and held in position on the rod by a screw 98 engages with the ratchet wheel 93. A spring 99 is located around the rod 95 above bracket 96, bearing at its lower end on said bracket and its compression force may be regulated through adjustment of the member 100 attached adjustably on the rod at the upper end of the spring and held in position by the screw 101. Rod 95 at its upper end is pivotally connected to one end of a bar 102 which is positioned substantially horizontal and which at its opposite end is pivotally connected at 103 to the slide bar 85. The disk 75 has a pin 104 secured thereto and extending rearwardly, this pin in each revolution of the disk coming against the upper side of bar 102 and depressing it with a consequent downward movement of rod 95 and operation of shaft 92 and connected parts through the engagement of pawl 97 with the ratchet wheel 93.

Figure 9:
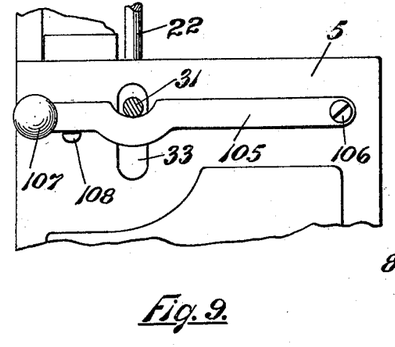
Fig. 9 is a fragmentary side elevation of the upper part of the housing, illustrating a detail of construction used for stopping the feed of the grinding wheel while the machine is in operation.

A latch bar 105 is pivotally mounted at one end at 106 on the side 5 of the housing and may be lifted to upper horizontal position, as shown in Fig. 9, a handle or knob 107 for manual operation being attached to its free end. It may be held in such upper position through engagement with the projection 108 on the side 5 in which case adjusting screw 31 will not be permitted to drop and lever 26 is held in upper position, no downward feed of the grinding wheel 20 taking place though the machine is running.

Any size of saw may be placed with its accompanying ratchet disk 75 on the arbor 80 and the proper position for it with reference to the grinding wheel obtained by turning the crank 94. The character of the teeth ground may be regulated by moving the member 84 on the slide bar 85 to the desired position, together with the selection of the right shape of grinding wheel. The finer adjustment of the wheel with reference to the saw is secured through turning the rod 22 to raise or lower the wheel. The extent of downward feed of the wheel may be regulated through operation of adjusting screw 31. The swing of the arm 58 and consequent adjustment for the pawl 72 for different ratchet disks is regulated through operation of adjusting screw 62, together with an adjustment of the block 66 through screw 68. With these various adjustments the machine may be fitted to grind any type and size of saw within the limits of the size of the machine.

After the adjustments for a saw are made and the machine is ready to start operation, the belt may be shifted from the loose to the fixed pulley on shaft 9. The wheel 20 will be driven at a very rapid rate and shaft 45 at a much slower rate of speed. With each rotation of shaft 45 the grinding wheel is raised and lowered, grinding the saw tooth below it on its downward movement. With each rotation of the shaft there is also a movement of the arm 58 and engagement of the pawl rod 72 with ratchet disk 75 to move it and the saw with it to a new position for the grinding of the next tooth, such change of position of the saw taking place when the grinding wheel is in uppermost position. In this connection, it is evident that the raising of the grinding wheel may be so adjusted by screw 31 that in the movement of the saw to a new position, the grinding wheel will grind the teeth at their outer ends during said movement, getting what is known as "backed" teeth as distinguished from pointed teeth, this occurring, however only at the later cycles of grinding or when the grinding is nearly finished. In the first cycle the grinding wheel is to pass only partly down between the teeth, each tooth receiving the same treatment. With the completion of the cycle which turns the ratchet disk 75 and the saw 76 through one complete revolution, the automatic operation of bar 102 and attached mechanism by pin 104, causes a slight elevation of the saw carrying members, so that with the next cycle, the teeth are further ground; and this continues until the teeth are fully and completely ground and sharpened. It is evident, of course, that the condition of the saw to be ground will govern the number of cycles necessary for the proper grinding and that the extent of elevation of the saw with each cycle completed may be governed by the position of the pin 104 on the disk 75, its distance from the center of the disk and the amount that it depresses bar 102 with each revolution. It is clear that the degree of damage which the saw may have suffered is not of importance except for using the proper adjustments therefor, as the machine is capable of grinding and sharpening saw teeth from those only slightly out of perfect condition to those so badly damaged as to be entirely worthless. In fact with a plain disk in place of the saw 76, it is readily possible to automatically make a complete and finished saw with any character of tooth desired, either as to shape, number, and depth.

The construction disclosed is practical and operative and has proven its practical usefulness over a considerable period of time. The invention is defined in the appended claims and I consider myself entitled to all forms of structure coming within their scope and do not wish to be limited to the exact structure shown and described.

I claim:

1. In a saw grinding and sharpening machine, means for rotatably supporting a saw, means for periodically turning the saw on its support by step by step movement to bring a succeeding saw tooth into the position occupied by the next preceding saw tooth, a rotatably mounted grinding wheel, means for driving the same, means for periodically moving the grinding wheel toward and away from the saw, and means for automatically elevating the saw after all of the teeth thereon have been acted upon by the grinding wheel, substantially as described.

2. In a saw grinding and sharpening machine, means for rotatably supporting a saw, means for successively grinding each tooth thereon, and means for automatically elevating the saw after all of the teeth have been ground to bring the same nearer the grinding wheel to thereby grind the teeth a greater distance in the succeeding cycle of grinding, substantially as described.

3. In a saw grinding and sharpening machine, a rotatably mounted saw, a grinding wheel, means for driving the same, means for periodically moving the grinding wheel toward and away from the saw, means for periodically turning the saw to bring successive teeth thereof into position to be acted upon by the grinding wheel, means for yieldingly securing the saw against rotative movement, and means for moving the saw toward the grinding wheel between successive cycles of grinding all of the teeth of the saw, substantially as described.

4. In a saw grinding and sharpening machine, means for rotatably supporting a saw, a grinding wheel, means for driving the same, a ratchet disk connected with the saw and having the same number of teeth, means for periodically moving the grinding wheel toward and away from the saw, an operating rod engaged with the ratchet disk, and means for periodically moving said rod back and forth to thereby move the disk and associated saw one step, substantially as described.

5. In a saw grinding and sharpening machine, a support, a horizontal slide bar mounted thereon for vertical adjustment, a member mounted on the slide bar for horizontal adjustment, a saw rotatably mounted on said member, a grinding wheel rotatably mounted on the support above the saw, means to drive the same, means for periodically moving the grinding wheel toward or away from the saw, means for periodically turning the saw step by step to bring successive teeth into position to be acted upon by the grinding wheel, and means for automatically elevating the slide bar between cycles of grinding the teeth of the saw, each cycle comprising a grinding of each tooth by the wheel, substantially as described.

6. In a saw grinding and sharpening machine, a support, a horizontal slide bar mounted thereon for vertical adjustment, a member mounted on the bar for horizontal adjustment, a saw rotatably mounted on said member, a grinding wheel rotatably mounted on the support above the saw, means to drive the same, means for periodically moving the grinding wheel toward or away from the saw, means for periodically turning the saw step by step to bring successive teeth into position to be acted upon by the grinding wheel, a shaft threaded into the slide bar and means for automatically turning said shaft to elevate said bar between cycles of grinding the saw teeth, each cycle comprising a grinding of all of the teeth of the saw, substantially as described.

7. In a saw grinding and sharpening machine, a rotably mounted saw, a disk having ratchet teeth thereon equal in number to the number of teeth on the saw, said disk being operatively connected with the saw, a grinding wheel rotatably mounted above the saw, means to drive the same, means for periodically moving the wheel toward and away from the saw, a pivotally mounted arm, a pawl rod attached to said arm and engaging with the disk, and means for oscillating said arm periodically about its pivot to thereby move the disk and associated saw one step between movements of the wheel toward the saw, substantially as described.

8. In a saw grinding and sharpening machine, a support, a post extending upwardly from the support, a plate slidably mounted for vertical movements thereon, a horizontal shaft rotatably mounted on the plate, a grinding wheel secured to the shaft, means for periodically lowering and raising said plate, a saw rotatably mounted below the grinding wheel, and means for periodically turning said saw step by step to bring successive teeth thereof into position to be acted upon by the grinding wheel, combined with an arm extending from the plate, a rod threaded at its lower end passing through the arm and having threaded connection at its lower end with an element of the means for periodically raising and lowering the grinding wheel, and a collar on the rod on which said arm rests, substantially as described.

9. In a saw grinding and sharpening machine, the combination of a support, a rotatably mounted grinding wheel, means for driving the same, means for periodically lowering and raising the grinding wheel, a saw rotatably mounted on the support, a ratchet disk operatively connected with the saw to turn therewith, said disk having the same number of teeth as the saw, a pin projecting from the disk, a support for the saw mounted for vertical adjustment on the first support, a shaft mounted on the first support and threaded into the saw support, a bar pivotally mounted on the saw support and extending horizontally so as to be engaged and depressed on each rotation of the disk, and means operatively connecting said bar and shaft for partially turning the shaft to change the position of the saw support with each complete revolution of the disk and associated saw, substantially as described.

10. In a saw grinding and sharpening machine, the combination of a support, a grinding wheel rotatably mounted thereon, means for driving the same, means for periodically lowering and raising the grinding wheel, a member mounted for vertical adjustment on the support, a saw rotatably mounted thereon, a ratchet disk operatively connected with the saw to turn therewith, said disk having the same number of teeth as the saw, a pin extending from the disk, means engaging with the disk to periodically turn the same step by step between downward movements of the grinding wheel, a bar pivotally mounted at one end on said saw carrying member, said bar being operated by the pin with each rotation of the disk, and means operated by the movement of the bar for elevating the saw carrying member, substantially as described.

11. In a saw grinding and sharpening machine, the combination of a support, a grinding wheel rotatably mounted thereon, means for driving the same, means for periodically lowering and raising the same, a member mounted for vertical adjustment on the support, a saw rotatably mounted on said member, a ratchet disk having the same number of teeth as the saw operatively connected with the saw to turn therewith, a pin extending from the disk, means engaging with the disk teeth to periodically turn the same step by step between downward movements of the grinding wheel, a bar pivotally mounted at one end on the saw supporting member, a vertical rod attached to the opposite end of the bar, a bracket on the support through which the rod passes, a spring around the rod and resting on the bracket, means on the rod to adjust the compressive force of the spring, a pawl connected to the rod, a horizontal shaft rotatably mounted on the support, a ratchet wheel thereon with which said pawl has engagement, a vertical shaft mounted on the support and having its upper end threaded into the saw supporting member, and gearing connections between the two shafts, substantially as described.

12. In a saw grinding and sharpening machine, a hollow supporting housing, a grinding wheel rotatably mounted on and above the housing, means to drive the same, means for periodically lowering and raising the grinding wheel, a saw rotatably mounted at the front of the housing below the grinding wheel, a ratchet disk operatively connected with the saw to turn therewith, said disk having the same number of teeth as the saw, an arm pivotally mounted at its lower end within the housing and extending through the top thereof, a pawl rod pivotally mounted at the upper end of the arm and disposed in engagement with the disk, and means for periodically oscillating said arm about its pivot to turn the disk and associated saw between downward movements of the grinding wheel.

13. In a saw grinding and sharpening machine, a hollow supporting housing, a grinding wheel rotatably mounted on and above the housing, means to drive the same, means for periodically lowering and raising the grinding wheel, a saw rotatably mounted at the front of the housing and below the grinding wheel, a ratchet disk operatively connected with the saw and having the same number of teeth as the saw, an arm pivotally mounted at its lower end within the housing and extending through the top thereof, a pawl rod pivotally mounted at the upper end of the arm and in engagement with the disk, a shaft extending through the housing, a cam thereon, a pivotally mounted lever within the housing equipped with a roller riding on said cam, spring means for holding the roller against the cam, a shoe attached to the arm, a roller on the end of the lever riding against said shoe to move the arm in one direction, spring means tending to draw the arm in the opposite direction, and means to drive the shaft, substantially as and for the purposes described.

14. A construction containing the elements in combination defined in claim 13 combined with means for adjusting the shoe to different positions on the arm from without the housing, substantially as described.

15. A construction containing the elements defined in combination in claim 13, in which said shoe is positioned vertically alongside of the arm and is pivotally mounted between its ends thereon, combined with an adjusting screw, a swivelled nut carried by the upper end of the shoe and through which the screw passes, said screw extending outwardly through a side of the housing, an operating head on the outer end of the screw, and means connecting the inner end of the screw to the arm, substantially as described.

16. In a saw grinding and sharpening machine, a hollow housing, a post on the upper side thereof, a plate slidably mounted on the post, a shaft rotatably mounted on the plate, a grinding wheel on the shaft, a shaft rotatably mounted in the housing, a cam thereon, an arm extending from the plate, a rod connected with the arm and passing downwardly into the housing, a lever pivotally mounted in the housing with which the lower end of said rod has connection, a shoe on the end of the lever, a second lever pivotally mounted within the housing and equipped with a roller riding on the cam, and a roller on the end of said second lever engaging with the shoe whereby on each revolution of the second shaft the grinding wheel is lowered and raised, substantially as described.

17. A construction containing the elements in combination defined in claim 16 and in which said shoe is pivotally mounted on said first lever, combined with means for adjusting the shoe to different positions operable from without the housing.

18. A construction containing the elements in combination defined in claim 16 and in which said shoe is pivotally mounted on the first lever, of an adjusting screw, a laterally turned lug on the lever through which the screw threads to bear against the shoe, said screw extending outwardly through a slot in the side of the housing, a spring acting against the opposite side of the shoe, and an operating head on the end of the screw, substantially as described.

19. A construction containing the elements in combination defined in claim 16 combined with a screw threaded through the end of the first lever and extending outwardly through a slot in a side of the housing, a bar pivotally mounted on said side of the housing and adapted to be elevated against the under side of the screw and means with which said bar engages to hold it in elevated position.

20. A construction containing the elements in combination defined in claim 16 combined with a screw connected with the first lever and extending therefrom through a slot in the side of the housing, and means mounted on the housing for engaging against the under side of the screw to elevate the same and attached lever, substantially as described.

21. In a machine of the character described, a saw and disk assembly comprising a sleeve threaded at one end and provided with a flange adjacent the opposite end, a disk having a consecutive series of ratchet teeth placed against the flange, a spacing collar located against the disk, a saw having the same number of teeth as the disk located against the collar, a second collar located against the opposite side of the saw, and a binding nut threaded on to the end of the sleeve against said second collar, substantially as described.

22. In combination, a relatively stationary arbor, a saw and disk assembly containing the elements defined in combination in claim 21 located on said arbor, a bearing washer located against the end of the sleeve, a spring around the arbor bearing against the washer, and a nut threaded on to the end of the arbor to compress the spring, substantially as described.

23. In a machine of the character described, means to successively grind saw teeth on a saw, means for rotatably mounting the saw, means for moving the saw step by step between grinding the teeth thereof, and means for moving the saw closer to the grinding means with the completion of each cycle of grinding the teeth, each cycle comprising a similar grinding of each tooth on the saw, substantially as described.

In testimony whereof I affix my signature.

JOHN P. HEDSTROM.